LE ROY J. BABCOCK.
AUTOMATIC AIR BRAKE VALVE FOR AUTOMOBILE ENGINES.
APPLICATION FILED AUG. 13, 1921.

1,420,073.

Patented June 20, 1922.

INVENTOR.
LeRoy J. Babcock
BY
ATTORNEY.

UNITED STATES PATENT OFFICE.

LE ROY J. BABCOCK, OF DENVER, COLORADO.

AUTOMATIC AIR-BRAKE VALVE FOR AUTOMOBILE ENGINES.

1,420,073.                Specification of Letters Patent.     Patented June 20, 1922.

Application filed August 13, 1921. Serial No. 492,180.

*To all whom it may concern:*

Be it known that I, LE ROY J. BABCOCK, a citizen of the United States, residing at Denver, in the county of Denver and State of Colorado, have invented new and useful Improvements in Automatic Air-Brake Valves for Automobile Engines, of which the following is a specification.

The present invention is directed to improvements in automatic air brake valves for automobile gas engines, and has for its primary object to provide a valve of this nature constructed in such a manner that it will operate to retard the speed of the engine so that a car equipped with the device can travel down a steep hill or grade without the necessity of changing from high gear to a lower gear, as is now the usual custom.

A further object of the invention is to provide a device of this character which can be easily and quickly attached to the intake manifold of an automobile internal combustion engine, and one which is extremely simple in construction, efficient in operation, and can be manufactured at a very small cost.

A still further object of the invention is to provide a valve of this nature so constructed that the driver can regulate or operate the same from the seat to control the speed of the car down grades without using the usual brakes while the car is traveling in high gear.

With these and other objects in view, this invention resides in the novel features of construction, formation, combination and arrangement of parts to be hereinafter more fully described, claimed and illustrated in the accompanying drawing, in which:—

Figure 1:
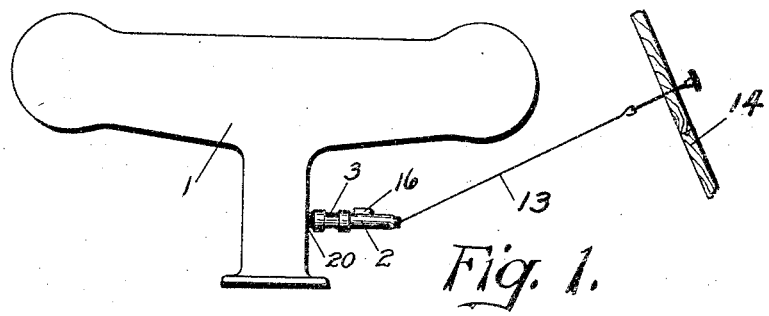
Figure 1 is a side elevation of the device showing it in place on the intake manifold of a gas engine.
Figure 3:
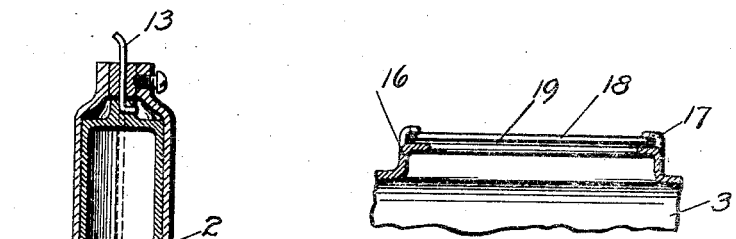
Figure 3 is a fragmentary side elevation.
Figure 4:
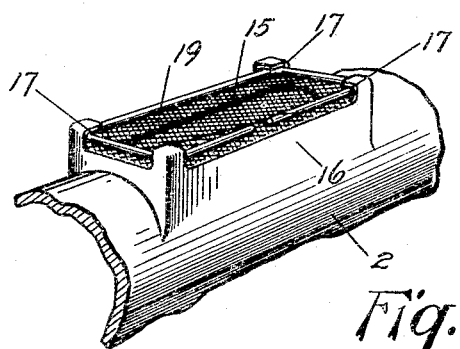
Figure 4 is a fragmentary perspective view to more clearly illustrate the manner in which the dust screen is secured to the brake valve casing.

Referring to the drawing 1 designates the intake manifold of a conventional form of gas engine in connection with which my improved air brake valve is used.

This valve comprises a cylinder 2, circular in cross section, one end of which is interiorly threaded for engagement with the threaded end of the casing 3, said casing having a bridge-piece 4 located centrally therein and provided with a plurality of ports 5, the purpose of which will appear later.

Formed centrally of the bridge-piece 4 is an opening 6 in which is slidably engaged the stem 7 of the valve 8, said valve being normally engaged on the seat 9 formed in the casing 3. The valve stem 7 extends into the cylinder 2, and encircling said stem is a coil spring 10, one end of which rests on the bridge-piece 4, while the other end thereof engages the inner nut 11 threaded on the stem. It is obvious that these nuts may be adjusted to regulate the tension of the spring 10, whereby the valve 8 may engage the seat 9 at varying yieldable pressures, as deemed desirable.

Slidably engaged in the cylinder 2 is a hollow piston 12, to one end of which is secured in any suitable manner one end of the wire 13, the other end of which leads to the instrument-board 14 of the car, and may be equipped with any suitable securing means to permit the piston 12 to be moved to the desired adjusted position within the cylinder 2.

A tapered slot 15 is formed longitudinally in the cylinder 2 to permit atmospheric air to enter the cylinder as well as the casing 3. It is obvious that upon forcing the wire 13 in one direction that the piston 12 will be moved to entirely close the slot 15, as shown in dotted lines in Fig. 2 of the drawing, or it may be moved to partially close said slot, as desired.

A box like casing 16 is formed on the cylinder 2, and in which the slot 15 communicates, each end of which if provided with a seat 17 for engagement with the corners of the resilient wire frame 18, said frame serving to retain the wire mesh screen 19 in place. This screen serves to prevent dust or other foreign matter from entering the cylinder through the slot 15.

The casing 3 has threaded thereon a nipple 20 which is tapped into the manifold 1 at any suitable point located between the carburetor and explosive chambers of the cylinders, and it will be of course understood that this brake valve can be connected in any suitable manner relative to the manifold as desired. The size, shape, and minor details of construction may be varied without departing from the spirit of the invention, or sacrificing any of the advantages thereof.

Figure 2:
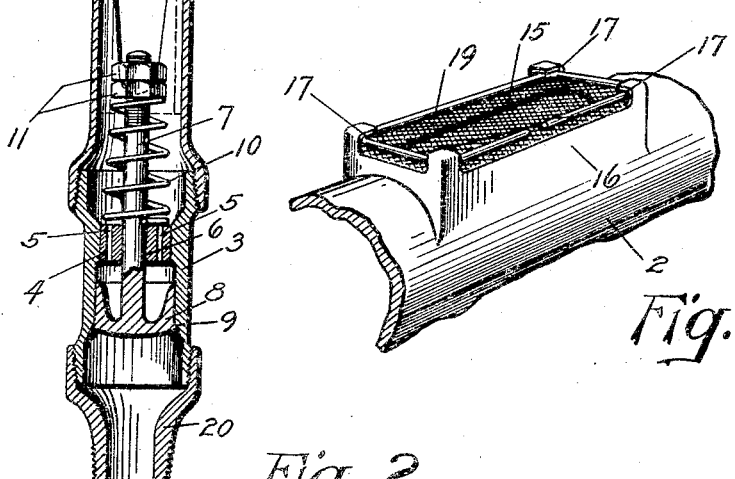
Figure 2 is a central sectional view through the device.

When a car equipped with the brake valve is travelling down a hill or grade, and it is desired to retard the speed thereof it is only necessary to move the piston 12 to a position as shown in full lines in Fig. 2, thereby permitting atmospheric air to enter the cylinder 2 through the slot 15, and which time the usual throttle valve is closed to prevent gas from the carburetor from entering the intake manifold. Upon each suction stroke of the engine pistons the valve 8 will be intermittently unseated to permit air to enter the intake manifold 1 after passing through the ports 5 of the bridge-piece. This atmospheric air will be compressed in the combustion chambers of the cylinders of the engine, thereby retarding the speed of the car so that the usual wheel brakes will not have to be used. In order to speed up the travel of the car that it is only necessary to partially or wholly close the slot 15 through the medium of the piston 12, whereupon a rich mixture of gas from the carburetor will be sucked through the intake manifold in the usual manner.

It will be apparent that in cold weather that the piston 12 can be moved to wholly close the slot 15 to prevent entrance of atmospheric air, thereby overcoming the difficulty of starting the engine.

While the device is designed primarily for use as a brake for gas engines it will, however, be apparent to those skilled in the art that such structure will serve to save fuel.

What is claimed is:—

In a device of the class described, the combination with the intake manifold of a gas engine, of a casing connected therewith, and having a perforated bridge-piece therein, a cylinder connected in alinement with the casing, a seat formed in the casing, a valve yieldably engaged with the seat, said valve having a stem slidable in the bridge-piece and extended into the cylinder, said cylinder having a tapered slot formed longitudinally therein, a hollow piston slidably mounted in the cylinder, and means for sliding the piston to regulate the passage of atmospheric air through said slot.

In testimony whereof I have hereunto set my hand in presence of two subscribing witnesses.

LE ROY J. BABCOCK.

Witnesses:
WILLIAM A. KINGSBURY,
ALBERT G. REDMOND.